United States Patent
Mathews

[15] 3,657,021
[45] Apr. 18, 1972

[54] EMERGENCY POWER PACK
[72] Inventor: John P. Mathews, Port Credit, Ontario, Canada
[73] Assignee: Mallory Battery Company of Canada Limited, Clarkson, Ontario, Canada
[22] Filed: Apr. 20, 1970
[21] Appl. No.: 29,848

[52] U.S. Cl..........................................................136/173
[51] Int. Cl.........................................................H01m 1/04
[58] Field of Search..................136/108, 112, 113, 171, 172, 136/173, 114

[56] References Cited

UNITED STATES PATENTS

| | | | |
|---|---|---|---|
| 1,432,025 | 10/1922 | Hoppie | 136/113 |
| 2,007,203 | 7/1935 | Kraeft | 136/173 |
| 2,369,931 | 2/1945 | Winckler | 136/113 |
| 2,909,587 | 10/1959 | Smedley | 136/112 |

*Primary Examiner*—Donald L. Walton
*Attorney*—Robert Levine

[57] ABSTRACT

An emergency power pack for a gas furnace, with a plurality of reserve type batteries in the power pack, kept normally inactive in a wall-mounted box, and rendered active by a simple manually operable lever on the outside of the box, with a cooperative electronic system for controlling the energy from said battery when rendered active, to supply pulse power initially to operate electrical controls for solenoid valves, and to then reduce the power supplied from the battery to the solenoids to be merely enough to hold the electrical controls in operated positions, thereby to reduce the drain on the battery as a power supply.

8 Claims, 9 Drawing Figures

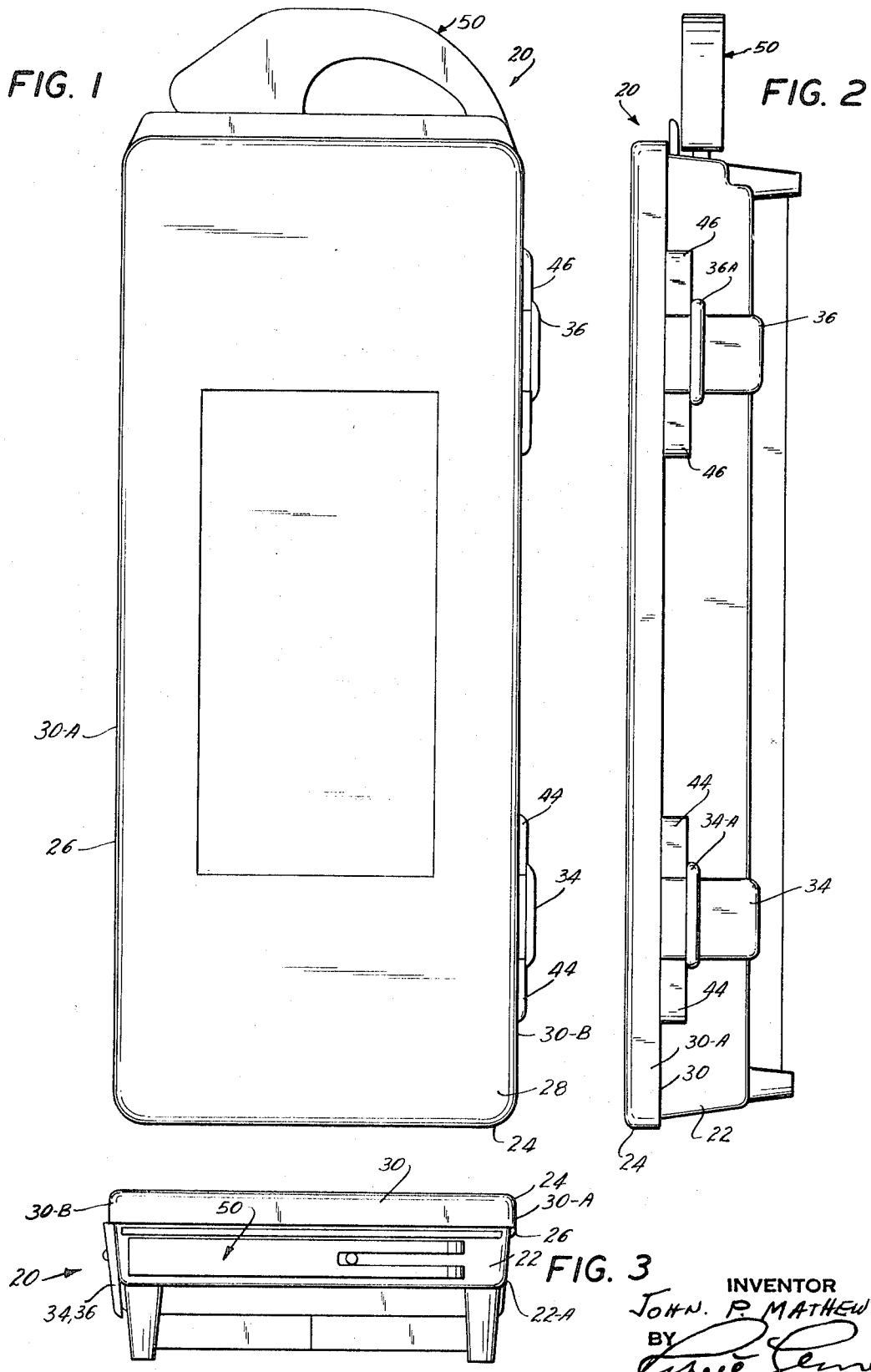

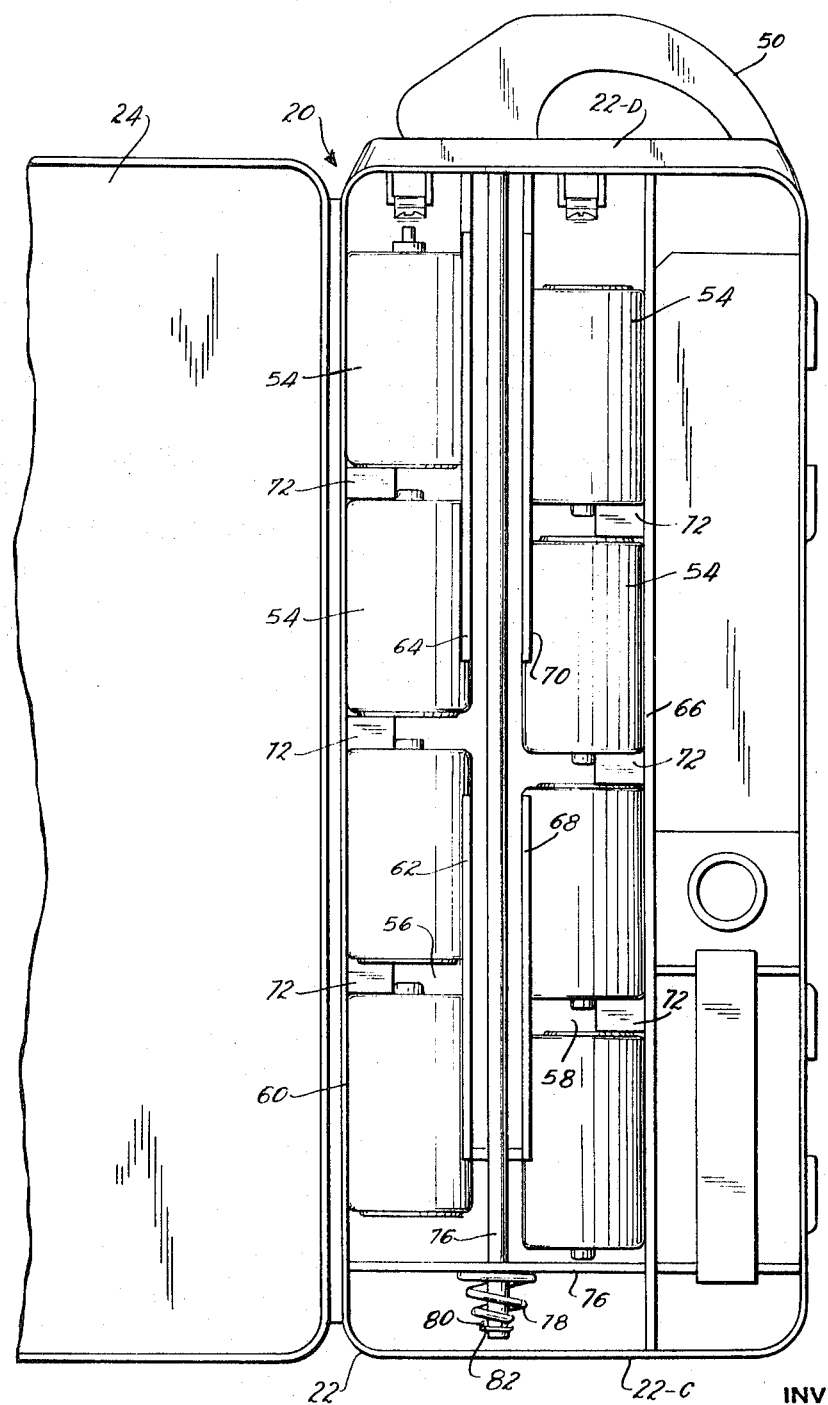

EMERGENCY POWER PACK

This invention relates to an emergency power pack and control system, and is particularly directed to such a reserve power pack and related system for controlling the heating operations of gas-supplied systems in homes and in other buildings during emergency conditions, when the usual external electrical power supply system of a public utility fails for a relatively substantial period of time during external adverse conditions.

In a number of applications involving the use of electrical controls, or actuators, which direct the operation of gas or hydraulic systems, there exists the possibility of failure of the external electrical power supply, whose failure will prevent the functioning of these control systems.

In the case of gas-fired home heaters, the failure of a public utility electric system due to severe winter conditions can cause failure of operation of the heating system, through loss of availability of electric power to operate electric valves and to energize control circuitry for such valves, even though the gas pressure and the gas supply are available and unaffected by the external conditions that affect the electrical power supply. Severe damage to essential plumbing systems can thus be caused by subsequent freezing of residential plumbing. In addition this can cause severe discomfort to the occupants of these dwellings.

It is the object of this invention to provide a substitute local electric power supply to operate the electric metering and control apparatus usually associated with these systems, to be immediately available when the public utility system fails.

In the case of certain gas-fired residential heaters, a battery-powered supply having a specially designed electronic regulator is added to the existing electrical apparatus, such that upon failure of the external electric utility supply, this local battery-operated power supply may be automatically or manually activated to supply power to the existing electrical apparatus for a period of time equal at least to the expected failure period.

One object of this invention is to provide a system of reserve batteries to be available and useful at a time of power failure, to operate home furnace controls.

A further object of the invention is to provide a battery power pack, employing a series of reserve battery cells disposed in a container, which serves normally as a housing for the battery cells, and which includes means to serve as an actuating control device to render the reserve cells immediately operative to serve as a source of power supply to control the regular circuitry of the gas valves, thermostats and related components that control heating of a gas furnace equipment to heat the house or other building for which furnace equipment is provided.

A further object of the invention is to provide a reserve power pack, consisting of a container having one or more elongated compartments to receive in co-axial alignment a series of battery cells with removable temporary insulating spacer means to hold the battery cells normally insulated in space relation while not needed or desired for use, with means supported as part of the container for moving the battery cells into electrically cooperating relationship upon removal of the insulating spacers.

Still another object of this invention is to provide a power pack employing a unitarily formed plastic container constructed to have elongated spaces or chambers to receive a series of reserve-type battery cells, nominally held spaced in aligned positions to be insulated from each other, and arranged to be rendered effective in series cooperation as a source of operating voltage for the regular equipment of the gas furnace, with the spaced chambers of the container arranged to hold the reserve battery cells in position, so that, upon operation of an actuator that cooperates with the container structure, the cells will be moved toward each other and into series contact relationship and rendered electrically effective in series to function as a battery of adequate operating voltage for the control equipment.

A further object of this invention to provide a reserve battery operated power supply having an electronic circuit regulator to provide maximum pull-in power for electromagnetic relays, and then to cut down the subsequent relay holding current to a value below the required initial power surge, to a minimum level sufficient to maintain the relay in an actuated position, thereby minimizing the electric drain on the battery, so the economy of current drain thus controlled will increase battery longevity in the power pack.

It is further an object of this invention to enable this emergency current to recycle during intermittent operation of this relay system, in the above manner of providing a maximum pull-in voltage to operate a relay with subsequent economizing reduction of voltage to minimum but adequate hold-in value.

It is further an object of this invention to cut down the level of hold-in power to minimize damage to inductive actuators for valves and relays, which may normally operate on alternating currents from the regular power system. The normal impedances of these relays and actuators are increased by the self inductance of the electric coils, when energized by alternating current, with the result that a lower alternating current would flow at the operating voltage. Consequently, the direct current of this emergency system must be applied at the equivalent reduced alternating current voltages and appropriately reduced to avoid burning out the coils of the actuators.

It is further an object of this invention to provide a structure to enable the activation of a reserve battery by manual operation of a mechanical actuator to a group of inactivated reserve cells, normally held in series juxtaposition such that normal safety separation of these unactivated cells is preserved by a series of insulated spacers, which when removed will permit subsequent collapsing of the columns of cells by means of the actuator assembly. The collapsing of these inactivated cells, one upon the other, simultaneously, is sufficient to cause the internally packaged electrolyte vials in these cells to break by means of special mechanical probes or plungers arranged to be in collapsing contact, one with the other, and thereby render the cells individually electrically active.

The cells, being assembled in normal series position, will all then be actuated and provide a total voltage equal to the number of cells multiplied by the individual cell voltage.

The cells used here are of the reserve type in which the electrolyte is stored in a breakable bottle within the cell and kept separate from the other components until the cell is to be made active for use. When the cell is to be made active, the bottle is broken and the electrolyte is released to make the cell active. A reserve cell of this type is shown in co-pending application of John F. Zaleski Ser. No. 701,491, now U.S. Pat. No. 3,484,297, filed Jan. 29, 1968, entitled Reserve Cell, case docket No. M–3000.

In accordance with this last mentioned object, the group of reserve type cells are disposed in axial alignment in a space in a box-type container, with small insulating spacing elements disposed between the successive cells to hold them insulated from each other during normal conditions when power is available from the usual public utility power supply.

When the public utility power supply goes off, the reserve battery supply of this invention is rendered active and effective by manually removing the insulating spacers from between the batteries, and then operating a manually operated lever provided for that purpose to jam the batteries axially into cooperative electrical relationship while at the same time mechanically breaking an internal vial in each battery containing the electrolyte for the battery, so the fluid of the electrolyte will immediately render the battery electrically operative.

One of the features of the invention is that the box or container for these batteries is made as one plastic unit, and serves also to house the electronic equipment which cooperates with the battery to control the solenoids of the electrical controls for the furnace.

The electronic circuitry that constitutes part of this invention includes an automatic transfer relay which operates to connect the electronic control equipment of this invention into the system to operate the electrical controls when the main power supply from the public utility system goes off, and which operates to disconnect the electronic control equipment when the public utility power is restored.

An important feature of the present invention involves the operation of the electronic control equipment of this invention in such manner as to draw upon the battery for pulse power at the maximum voltage of the battery to operate the solenoid elements of the electrical controls, and then to reduce the voltage from the battery as supplied to those solenoids to a value below the pulse operating value but sufficient to hold the solenoid operated controls in operated positions, with minimum drain on the battery, in order thus to maximize the operating life of the battery.

The construction and arrangement of a reserve power-pack assembly as a packaged unit, and the related control circuitry which the power-pack services, are described in more detail in the following specification, taken together with the accompanying drawings, in which:

FIG. 1 is a front elevational view of the housing for the power-pack;

FIG. 2 is a side elevational view of the housing of FIG. 1;

FIG. 3 is an elevational end view of the housing shown in FIG. 1;

FIG. 4 is a front elevational view of the housing of FIG. 1 with the door open to expose the construction, arrangement and contents within the housing, including batteries and separators within the housing, with the batteries shown superposed but spaced by removable spacers;

Figure 5:
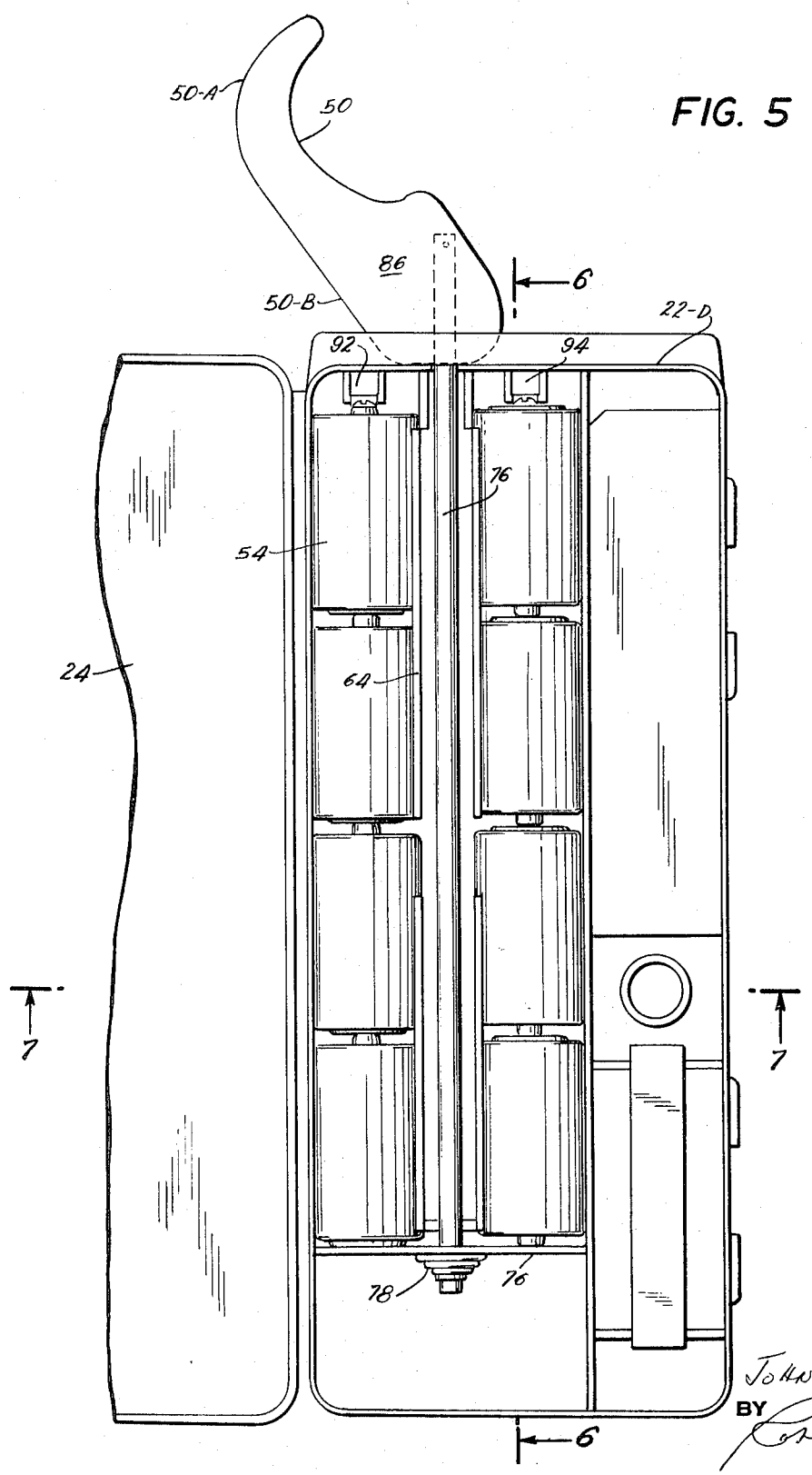
FIG. 5 is a view similar to the view in FIG. 4 but with the spacers removed, and the several batteries in each group moved to active electrically engaging position, accomplished by operation of a handle operator, with the handle shown in operated position.

As shown in FIGS. 1, 2 and 3 a power-pack housing, in accordance with this invention, comprises a receptacle or box portion 22 with a hinged cover or door that is integrally connected to a back side of the box 22 along and by an elongate longitudinal strip 26. The door 24 is formed as a shallow recessed tray-like element having a front base plate structure 28 with a flanged rim or apron 30 encircling the front plate 28. The back portion of the flanged rim or apron 30 is integrally joined to said elongate longitudinal strip 26 that is, in turn, integrally joined to the outer surface of the left hand side wall 22–A of box 22. The left hand side of the flanged rim or apron 30, identified as 30–A, is thus integrally connected to and supported on said hinge strip 26, previously referred to, which strip 26 is, in turn, integrally formed on and connected to the adjacent portion of the side wall 22–A of the receptacle portion 22 of the box 20. The front or right hand side 30–B of the flanged rim or apron 30 has integrally connected thereto two locking tabs 34 and 36 which are respectively provided with oppositely extending transverse detents 34–A and 36–A which are movable into position under two respective pairs of raised bosses 44–1 and 44–2, and 46–1 and 46–2, to lock the door 24 in closed position against casual self-opening, but to permit easy closure by pressing the two tabs 34 and 36 against the box, and to permit easy opening by lifting the two tabs.

Also visible in FIGS. 1 and 2 is a top handle 50, which is pivoted on top of the box, as will be clear upon reference to FIGS. 4 and 5, to perform the internal operation within the box that places the batteries in electrical circuit relationship, and also performs a compressing operation that places the reserve batteries in active operating condition by fracturing the vials within the batteries to release the electrolyte in each battery to render the battery active.

As shown in FIG. 4, the box 20 is shown open with the door 24 fully open to expose the inside of the box within which the batteries 54 are disposed. The box may be provided with space for more batteries or for fewer batteries, and in the present instance shows two groups of four batteries in each group, disposed in two space-ways 56 and 58 defined between the left hand side wall 60 of box 22 and an inner pair of walls 62 and 64. The second group of batteries is disposed in space-way 58 between a right hand wall 66 and two inner side walls 68 and 70. The two inner walls 64 and 70 are anchored at their upper ends to the upper end wall 22–D of the box. The right hand side wall 66 extends from the lower end 22–C of the box to the upper end 22–D of the box and is anchored at both ends to the respective end walls 22–C and 22–D of the box.

In the view shown in FIG. 4, the batteries are held in separated positions so they will not engage each other. For that purpose spacers 72 are provided and disposed between the facing ends of the adjacent respective batteries 54.

As will be observed in FIG. 4, the batteries are arranged with their respective co-axial terminals of one polarity facing the bottom surfaces of the next adjacent batteries which are of opposite polarity, so the batteries will be connected in true series circuit relationship when the spacers 72 are removed and the batteries are shifted into direct and physical engagement.

Normally, when full and adequate power is available from the public utility system for the operation of the controls for the burner, the power-pack equipment as shown in FIGS. 1, 2, 3 and 4 will be kept with the batteries spaced by separators 72 as shown in FIG. 4. When the public utility power system fails, and energy is not available to operate the controls of the gas furnace, the spacers 72 are manually removed, and the batteries are then pressed into active operating condition by movement of the handle 50, which operates as a pivoted lever to pull upon a pull rod 76 disposed longitudinally of the box 22 and having a transverse pressure bar 76 supported on a spring 78 having at its lower end 80 resting on a washer 82 suitably held in fixed position on the lower end of the pull rod 76.

The construction and manner of operation of said handle and operating lever 50 are illustrated in more detail in FIG. 5, in which said handle 50 is shown as a lever having an operating arm 50–A and a pressure arm 50–B. The lever is shown pivotally connected to the upper end of the pull rod 76 at a pivot point 86. As the lever 50 is pivoted around the pivot point 86, the arm 50–B is moved into position against the top end wall 22–D of the box 22, and, in the course of that movement, raises the pull rod 76 to the position shown in FIG. 5, at which the spring 78 is compressed and the transverse pressure bar 76 elevated to raise all the batteries in both groups to cause the adjacent batteries in each group to engage each other in series circuit relationship, with the two top batteries pressed upward to electrically engage two resilient terminals 92 and 94 to provide the full voltage of both groups of batteries between those two terminals 92 and 94, for energizing the associated circuitry disposed within the box 22, for purpose of controlling the external controls for the furnace utilizing solenoid operators for the valves and the like. The transverse pressure bar 76 serves also as electrical conductor between the two bottom batteries.

Figure 6:
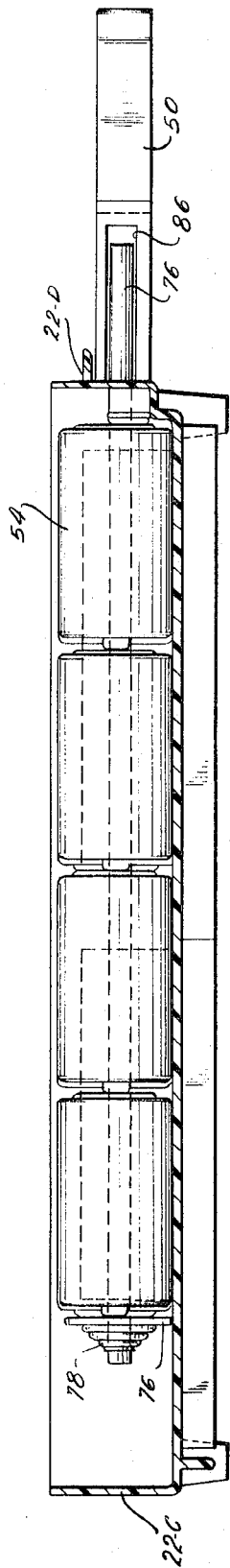
FIG. 6 is a vertical elevational view, partly in section, with one side wall of the box removed, looking sidewise into and at the housing of FIG. 5 along the line 6—6.

In FIG. 6 is shown a vertical side view of the box of FIG. 5, with one side wall of the box removed to expose the batteries, and to illustrate the appearance and location of the batteries and the manner in which the pull rod 76 is raised and pivotally connected to the lever handle 50 by means of the pivot pin 86.

Figure 7:
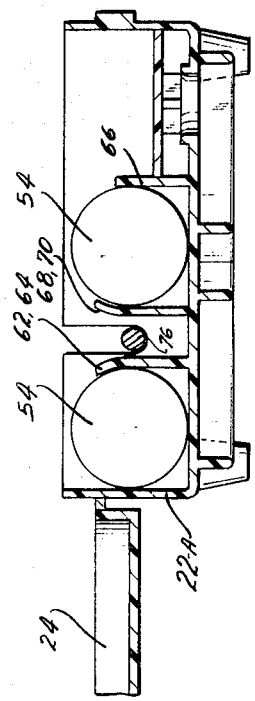
FIG. 7 is a transverse view, partially in elevation and partially in section, looking upwardly into and at the open housing in FIG. 5, along the transverse viewing plane 707 of FIG. 5.

FIG. 7 shows a transverse view of the box in FIG. 5, and shows more clearly the general construction of the inner walls 62 and 64 adjacent one group of batteries, and the walls 68 and 70 adjacent to the second group of batteries, with the long inner side wall 66 shown for cooperating with the two walls 68 and 70 to hold the batteries in place. The walls 62 and 64 for the other group of batteries cooperate with the side wall 22–A of the box 22 to hold those batteries in place.

Figure 8:
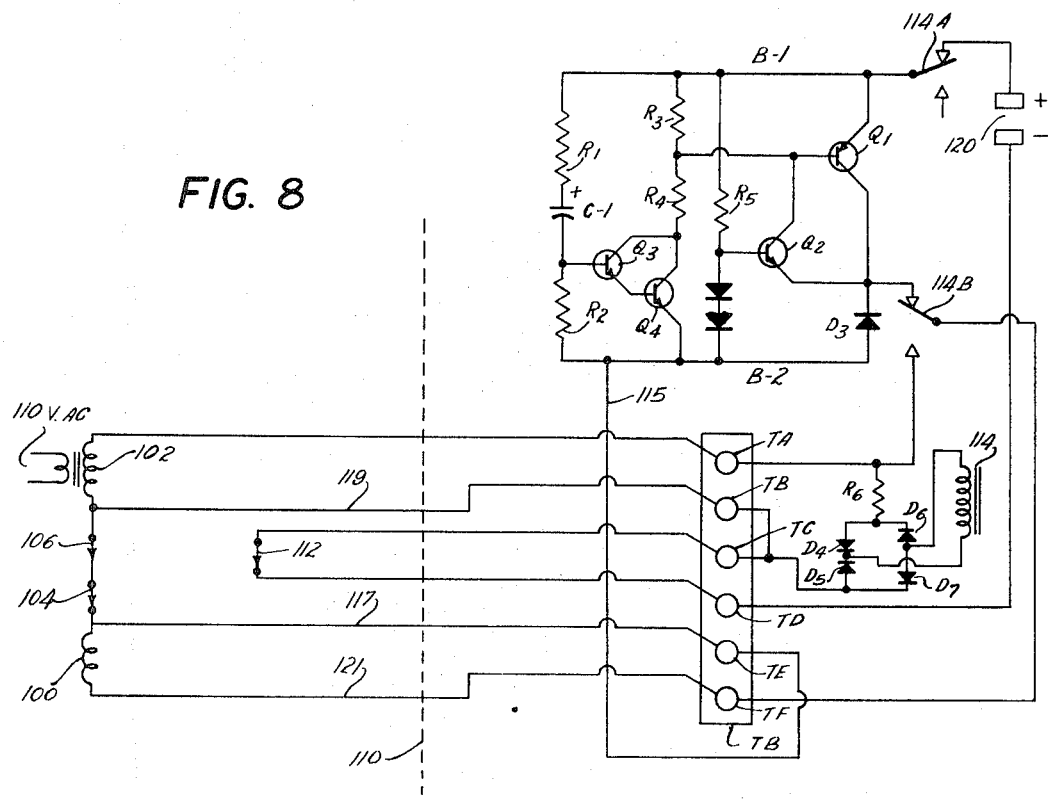
FIG. 8 is a schematic circuit diagram of the electronic control circuitry included as part of the control pack of this invention.

FIG. 8 is an electrical circuit diagram showing the arrangement of the various elements of an electronic circuit for controlling a solenoid operated gas valve of the furnace, when the regular public utility supply becomes unavailable. The elements are also schematically arranged to show the circuitry as it will be contained in the control box, and these elements that are out of the control box. Thus for example, the solenoid operated valve 100 will be located adjacent the furnace, and the power transformer 102 which receives the energy from the utility power supply may also be disposed near the furnace. A protective high temperature limit switch 104 at the furnace will serve to cause the gas valve 100 to close to discontinue the supply of gas to the furnace if the temperature exceeds a predetermined high limit. The thermostat 106 is located in the area where the temperature is to be maintained at a desired level by the furnace, and for convenience is merely indicated outside the control box. All the foregoing equipment outside the control box, including the elements 100 to 104, is already present as equipment to which the present invention is to be applied.

The elements of the present invention are shown on the right hand side of the schematic separation line 110 which separates all of the elements on the right hand side as contained in the present inventive system, while those elements on the left hand side are impliedly the elements presently available in the system to be protected.

In order to obtain the greater flexibility of this invention, an auxiliary high temperature switch 112 is additionally provided in the new equipment of this invention, to supplement the high temperature limit switch 104 which is already part of the existing equipment.

When the power is normally available from the public utility system, energy is received from the system through the stepdown transformer 102, and directly applied to the solenoid through the thermostat as a switch, by a simple circuitry which includes the transformer 102, the thermostat 106, the high limit switch 104 and the solenoid of the gas valve 100. For the purpose of the present invention, the circuitry must be re-arranged and disposed to be automatically responsive to a condition indicating whether the public utility power is available or not.

In accordance with the requirements of this invention, the power transformer 102 is connected to terminals TA and TB on a terminal block as indicated. The two terminals TA and TB supply energy to a rectifier bridge including diodes D–4, D–5, D–6 and D–7, through a limiting resistor R–6, with the operating coil of a relay 114 connected to the opposite juncture points of the diode bridge to be energized by direct current from bridge when the power transformer 102 is energized from the public utility circuit. When the public utility circuit voltage drops out due to an external fault in the power system, the relay coil 114 receives no current, becomes de-energized and permits its switches 114–A and 114–B to move to their back contact positions. When the relay is energized, those switches 114–A and 114–B are moved to their front contact positions. As shown in FIG. 8, the relay 114 is deenergized when said two switches 114–A AND 114–B are in their respective back contact positions and, in those positions, the reserve battery 120 made up of those shown in FIGS. 1, 2, and 3, is connected into the circuitry, in substitute for the nonenergized power transformer, and the electronic equipment of this invention is then permitted to function.

Assuming that the transformer 102 is not energized as a result of an external system fault, the control equipment of this invention is now ready to function. The high limit switch 104 on the furnace, and the thermostat 106, and the auxiliary high limit switch 112 are closed, relay 114 is de-energized and its switches 114–A and 114–B are in their back positions as shown. When the battery 120 is thereupon connected to the electronic equipment, current flows through resistor R–1, capacitor C–1 as a pulse, through base to emitter junctions of transistors Q–3 and Q–4, to bus line B–2 and through the conductor 115 to terminal TE, then through conductor 117 and through high limit switch 104 and thermostate 106 to and through conductor 119 to terminal TB, then to terminal TC, then through auxiliary limit switch 112 to terminal TD, and back to the negative terminal of the battery 120. The current through base to emitter junctions of Q–3 and Q–4 turns those transistors on, to draw current through resistor R– 4 and the emitter to base circuit of transistor Q–1, which turns Q–1 on to permit a heavy current to flow through Q–1 and the relay switch 114–B to terminal TF and conductor 121 through the solenoid of the gas valve on the furnace, thence through the high limit switch 104, the thermostat 106, then through conductor 119, through terminals TB and TC through the auxiliary limit switch 112 and back through terminal TD to the negative terminal of the battery 120, to send a high current pulse through the solenoid of the gas valve 100 to operate the gas valve to open position, to permit gas to enter the furnace burner. The arrangement used here is the usual fail-safe arrangement which closes the gas valve when all control power becomes unavailable.

One of the objects of this invention is to provide a control circuit that will limit the drain on the reserve battery. Once the gas valve has been operated to open position, the power necessary in the solenoid to hold the valve in such operating position is considerably less than the power needed to operate the valve in the first instance. Therefore, once the valve has been opened, the power needed to hold it open, and the current through the solenoid for that purpose, may be reduced.

The capacitor C–1 permitted the transistors Q–3 and Q–4 momentarily to turn on. Now as the capacitor becomes fully charged, the transistors Q–3 and Q–4 are turned off due to the change in potential at the juncture between the capacitor C–1 and the resistor R–2. The circuit then functions as a voltage regulator consisting of the power transistor Q–1 and its control resistor Q–2, according to the voltage supplied to the base of the transistor Q–2 by the voltage divider circuit including resistor R– 5 and the two diodes D–1 and D–2 in series, which produce the desired reference voltage by their forward voltage drops. Q–2 now becomes substituted for Q–3 and Q–4 which are held open because the capacitor C–1 no longer provides proper potential to Q–3 to turn Q–3 on. Resistor R–3 cooperates with the control transistor Q–2 in providing a suitable control voltage at the base of transistor Q–1. Diode D–3 is provided to absorb any reverse voltage transients generated by the inductance of the solenoid valve when the voltage is changing.

However, since C–1 charges gradually a voltage ramp is produced which reduces greatly any transient voltage which may be produced. When high limit switch 104, or auxiliary limit switch 112 or the thermostate 106 open, no current flows in the circuit and the solenoid operated valve re-closes and cuts off the gas to the furnace. At the same time, capacitor C–1 discharges through R–1, R–5, D–1, D–2 and R–2 and so the control circuit is reset, so that the next time that control circuit is completed by the closing of high limit switch 104, auxiliary limit switch 112 or the thermostat 106 (whichever one was open), the high current necessary to initially operate the solenoid valve is again supplied from battery source 120, and then once again as C–1 charges, the voltage drops down to the very low voltage that will supply only sufficient current to hold the valve open, as long as is desired to maintain the temperature correct.

When A.C. power returns, the relay 114 is energized from the 24 V.A.C. transformer 102 through terminals TA and TB, relay contacts 114–A and 114–B are moved to forward positions so that the battery 120 is disconnected, and the electronic circuit is completely isolated from the furnace controls, and the furnace controls are restored to their normal 24

V.A.C. mode of operation from transformer 102. The auxiliary high limit control 112 is also disconnected at the same time, from the battery.

To suitably modify the output of the electric battery in this device to meet the requirements of the invention it is necessary that the circuit be capable of responding to a signal from a thermostat and for any auxiliary limit controls on the furnace itself.

It is necessary that these signals initiate a strong maximum pull-in pulse from the battery to the solenoid of the gas valve and in a matter of approximately 2 seconds, the strong pulse is attenuated to a lower voltage level equal to the holding requirements of the solenoid.

The lower level of hold-in power is maintained until the thermostat or auxiliary controls open the circuit.

After this event limited power is drawn from the battery. This provides maximum economy for the limited energy of the battery. In addition excess power to the solenoid is eliminated preventing overheating conditions.

Figure 9:
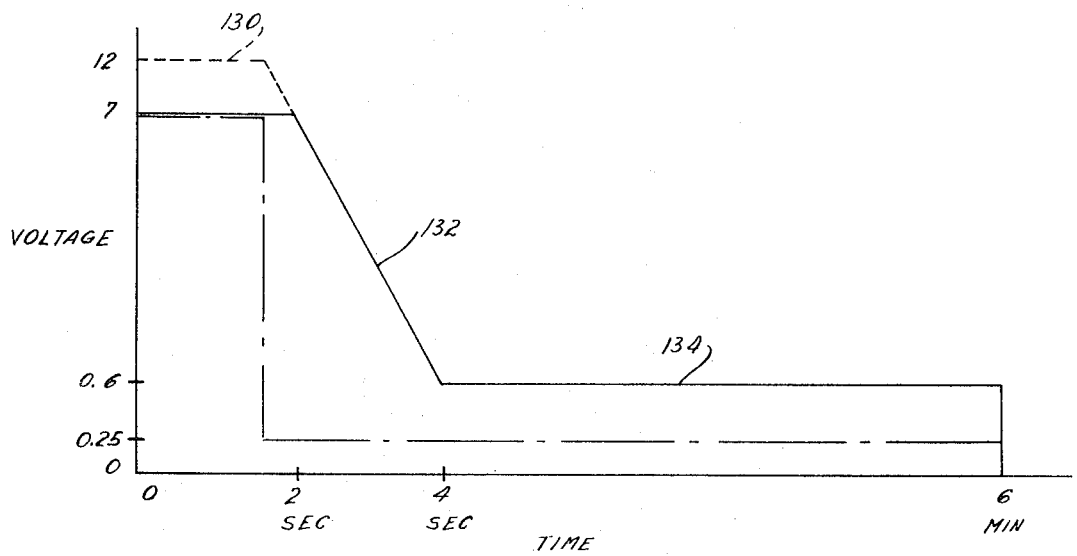
FIG. 9 is a graph showing how the d.c. voltage is first applies as a high voltage pulse to operate the solenoid elements, and then reduced to a small adequate holding value.

FIG. 9 shows schematically how the current drain on the battery is controlled. Thus, for example, when voltage is first applied to the solenoid of the gas valve, the full voltage 130 is applied to the solenoid. The operation of the gas valve may normally take 1 second. The voltage on the solenoid is applied for about two seconds with the circuitry as arranged, and as the capacitor C-1 gradually assumes its full voltage, the power transistor control, as explained in connection with FIG. 8, serves to reduce the current through the solenoid as generally indicated by the line 132 of the graph in FIG. 9, to a lower level of current shown by the line 134, which represents sufficient current through the gas valve solenoid to hold the valve in operated position to which it was moved by the current of value 130.

The circuitry described in FIG. 8 provides several functions and features:

1. A timing section;
2. A voltage regulation section;
3. A resetting capability;
4. A capability for disconnecting the batteries and regulator circuit from the furnace control system, and restoring the furnace control system to the equivalent of its original condition; and
5. A capability, in addition to the economizing function of the regulator during its emergency operation, which is the additional economizing function of the device during return of normal A.C. external power, at which time the battery is totally disconnected from the regulator circuit and is in an open circuit condition.

What is claimed is:

1. An emergency reserve power pack, comprising a supporting box structure having a space for receiving and accommodating and aligning a reserve type battery chain; a reserve type battery chain placed in said space; removable spacer means between adjacent batteries in the chain for normally holding them physically and electrically separated; and means, manually operable, and effectively operable, upon removal of said spacer means, for manually shifting said batteries into physical and electrical series circuit relation and for rendering said reserve batteries active establish an active electrical power source for energizing an external circuit.

2. An emergency reserve power pack, as in claim 1, in which said supporting box structure comprises an elongated spaceway therein to serve as an elongated chamber to receive and accommodate and align a battery chain; a battery chain placed in said spaceway; and said manually operable means comprises a lever external of said box and pivoted at one end to be operable about that pivoted end as a lever to accomplish the compressive shifting of said batteries into physical and electrical contact between adjacent batteries; resilient means disposed to be stressed upon operation of said manually operable means and disposed relative to said batteries to maintain such electrical contact under pressure.

3. A reserve power pack, as in claim 1, in which said manually operable means includes a pivoted lever, and means operable by said lever for moving said batteries to operating electric circuit relationship.

4. An emergency reserve power pack, as in claim 2, in which said manually operable means includes, further, an operating rod extending through a wall of said box structure; a cross-bar transverse to said operating rod for supporting at least one battery chain; at least one battery chain supported by said cross-bar; and said rod being connected to said pivoted handle, to translate angular movement of said pivoted handle to longitudinal translation of said rod to move said cross-bar in the longitudinal movement of said rod to shift the batteries to establish said physical and electrical contact between adjacent batteries.

5. A reserve power pack, as in claim 4, in which said supporting box structure comprises an elongated box structure having a plurality of elongated spaceways therein, each of which serves to receive and accommodate and align a plurality of batteries as a part of a total electrical battery chain; a plurality of batteries placed in each of said spaceways to form said total electrical battery chain; and said manually operable means moves said cross-bar to act upon the several parts of said total battery chain to place all of said reserve batteries in active condition in a predetermined circuit relation.

6. A reserve power pack, as in claim 5, in which said manually operable means includes an extension rod and a cross-bar supported on said extension rod, with means coupling said extension rod to said pivoted lever, to enable said lever to pull on said extension rod and thereby on said cross-bar to cause said cross-bar to shift said batteries into operative electric circuit relationship.

7. An emergency reserve power pack, as in claim 6, in which said resilient means comprises a compression spring disposed to be functionally operative to be compressed between said rod and said cross-bar and to impress a compression force on said batteries to hold them tightly in electrical contact.

8. An emergency reserve power pack, as in claim 1, in which said manually operable means includes a handle external of said supporting box structure and pivoted at one end about a pivot to be operable about that pivoted end as a lever, said handle shaped to have a flat seating surface at said pivoted end of said handle and said flat surface being adapted to seat on the outer surface of said box structure; an operating rod connected to said pivot and through said outer surface of said box structure; and said flat surface being spaced from the pivot a predetermined distance to determine the distance of movement of said rod by said lever to effect engagement of the batteries for active power functioning.

* * * * *